(12) United States Patent
Diab

(10) Patent No.: US 8,108,723 B2
(45) Date of Patent: Jan. 31, 2012

(54) TRIGGERED RESTART MECHANISM FOR FAILURE RECOVERY IN POWER OVER ETHERNET

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 733 days.

(21) Appl. No.: 12/058,982

(22) Filed: Mar. 31, 2008

(65) Prior Publication Data

US 2009/0249112 A1 Oct. 1, 2009

(51) Int. Cl.
*G06F 11/00* (2006.01)
(52) U.S. Cl. .......... 714/24; 714/14; 714/22; 714/36
(58) Field of Classification Search ............ 714/14, 714/22–24, 36
See application file for complete search history.

(56) References Cited

U.S. PATENT DOCUMENTS

| | | | |
|---|---|---|---|
| 6,658,597 B1 * | 12/2003 | Ker et al. | 714/23 |
| 2005/0066218 A1 * | 3/2005 | Stachura et al. | 714/3 |
| 2006/0109728 A1 * | 5/2006 | Dwelley et al. | 365/222 |
| 2006/0143583 A1 * | 6/2006 | Diab et al. | 716/4 |
| 2006/0239183 A1 * | 10/2006 | Robitaille et al. | 370/217 |
| 2008/0086659 A1 * | 4/2008 | Ishikawa et al. | 714/22 |
| 2008/0113652 A1 * | 5/2008 | Liu | 455/414.1 |
| 2008/0155323 A1 * | 6/2008 | Hogan et al. | 714/22 |

* cited by examiner

*Primary Examiner* — Scott Baderman
*Assistant Examiner* — Sarai Butler
(74) *Attorney, Agent, or Firm* — Duane S. Kobayashi

(57) ABSTRACT

A triggered restart mechanism for failure recovery in power over Ethernet (PoE). Powered devices (PDs) that fail can be remotely recycled by a power sourcing equipment (PSE). After detection of a failure of a PD, such as by the failure to receive a status message, a PSE can generate a reset signal (e.g., power cycle, reset pulse, etc.) on the port. This reset signal can cause the PD to perform a full power cycle or quick restart.

20 Claims, 5 Drawing Sheets

TRIGGERED RESTART MECHANISM FOR FAILURE RECOVERY IN POWER OVER ETHERNET

BACKGROUND

1. Field of the Invention

The present invention relates generally to power over Ethernet (PoE) and, more particularly, to a triggered restart mechanism for failure recovery in PoE.

2. Introduction

In a PoE application such as that described in the IEEE 802.3af and 802.3at specifications, a power sourcing equipment (PSE) can deliver power to a powered device (PD) over Ethernet cabling. Various types of PDs exist, including voice over IP (VoIP) phones, wireless LAN access points, Bluetooth access points, network cameras, computing devices, etc.

In accordance with IEEE 802.3af, a PSE can deliver up to 15.4 W of power to a single PD over two wire pairs. In accordance with IEEE 802.at, on the other hand, a PSE may be able to deliver up to 30 W of power to a single PD over two wire pairs. Other proprietary solutions can potentially deliver higher or different levels of power to a PD. A PSE may also be configured to deliver power to a PD using four wire pairs.

In an enterprise environment, network managers may have hundreds or even thousands of PDs to manage across a wide distribution area. This management task can be costly in practice. Consider, for example, a simple task such as power cycling. In this process, IT staff personnel would typically be sent out to locate a particular device and to unplug and re-plug a power cord to force a reboot of the device. This menial task is costly both in time and in resource. What is needed therefore is a triggered restart mechanism for failure recovery in PoE.

SUMMARY

A triggered restart mechanism for failure recovery in PoE, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
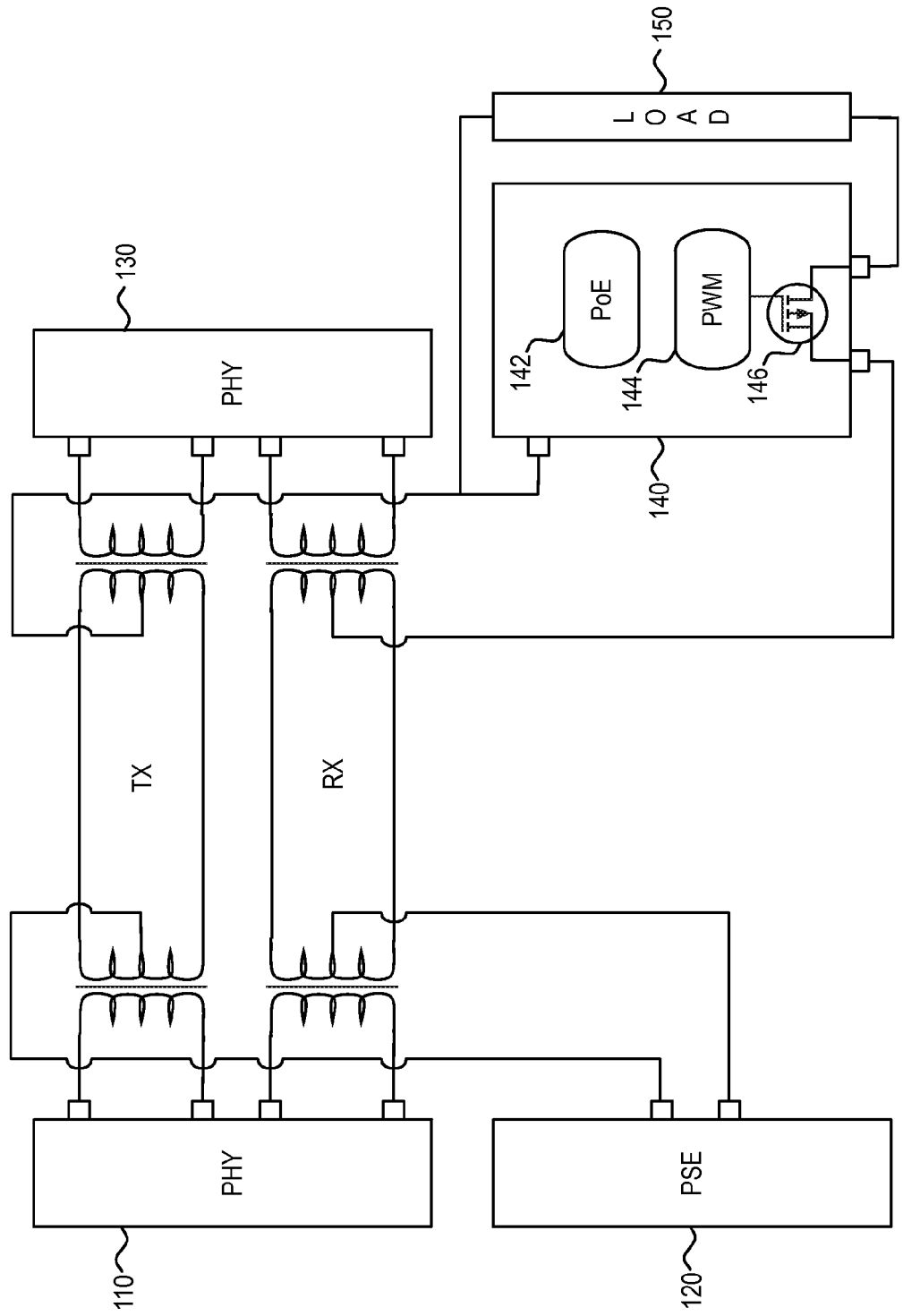
FIG. 1 illustrates an embodiment of a PoE system.

FIG. 1 illustrates an embodiment of a PoE system. As illustrated, the PoE system includes PSE 120 that transmits power to PD 140. Power delivered by PSE 120 to PD 140 is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10 GBASE-T and/or any other Layer 2 PHY technology. Here, it should be noted that PoE that would not use Layer 2 technology would not require the presence of a PHY.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE may be able to deliver up to 30 W of power to a PD over two wire pairs. A PSE may also be configured to deliver power to a PD using four wire pairs. Other proprietary solutions can potentially deliver higher or different levels of power to a PD. In general, high power solutions are often limited by the limitations of the cabling.

In the PoE process, a valid device detection is first performed. This detection process is facilitated by the detection of a signature resistance, which is designed to identify whether or not the PSE is connected to a valid device. This ensures that power is not applied to non-PoE capable devices. After a valid PD is discovered, the PSE can optionally perform a Layer 1 power classification. This power classification is facilitated by a classification resistor at the PD. In the IEEE 802.3af standard, the classification step identifies a power classification of the PD from the various power classes of 15.4 W, 7.0 W, and 4.0 W.

Figure 2:
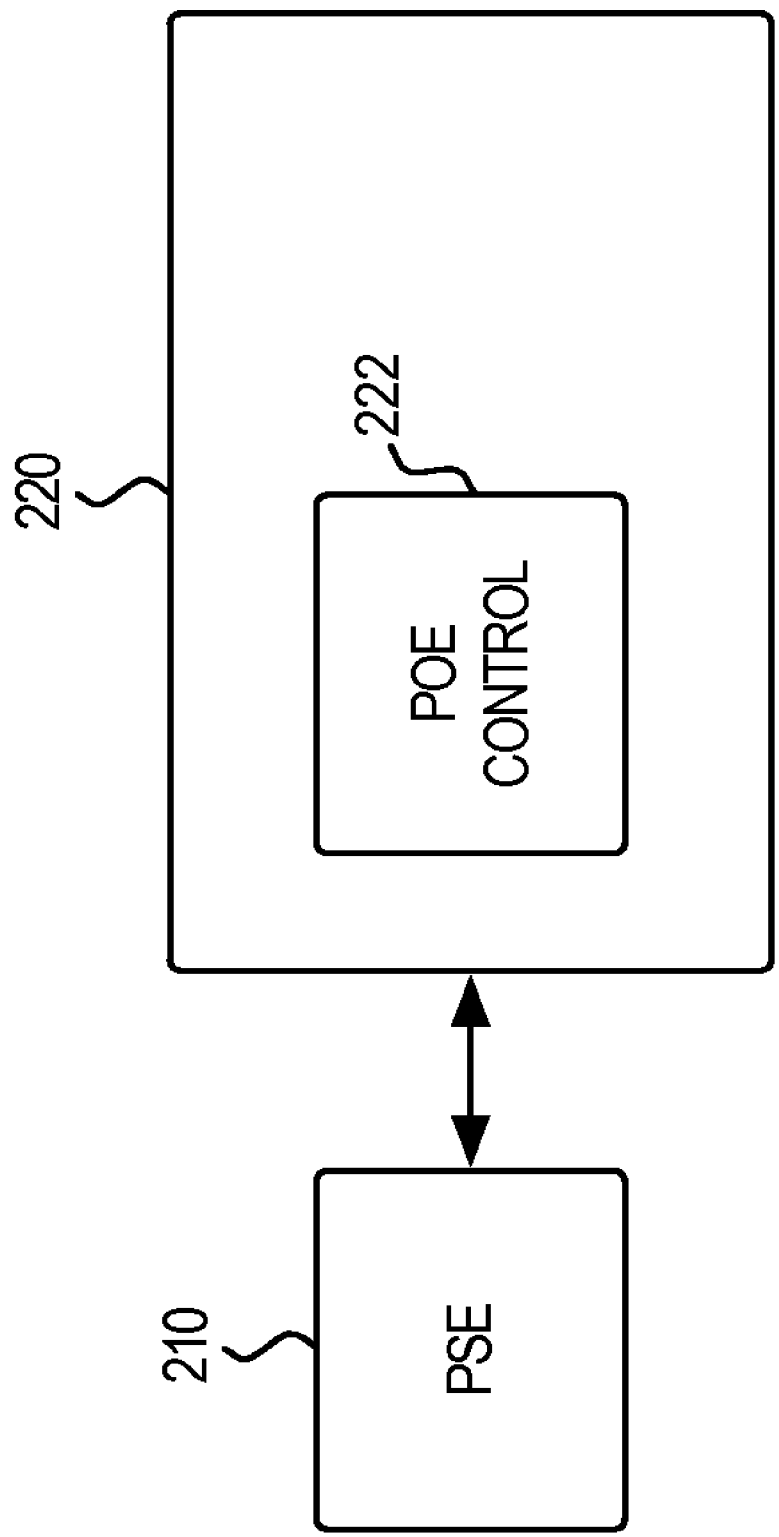
FIG. 2 illustrates a block diagram of a PoE system.

In various PoE implementations, a Layer 2 power classification process can also be initiated to reclassify the power class or implement some form of dynamic classification. As illustrated in FIG. 2, this Layer 2 power classification of PD 220 can be facilitated by PoE control module 222, which incorporates a Layer 2 agent. In one embodiment, PoE control module 222 can be part of a LAN-on-motherboard (LOM) chip that is embedded on a motherboard to handle network communications.

In general, Layer 1 communication such as the physical layer of the OSI networking model is limited because it only provides one-way, one-time communications. Layer 2 communication such as the data link layer, on the other hand, can transmit data packets that include encoded bits, and can provide transmission protocol knowledge and management. In general, Layer 2 communication provides a flexible mechanism that enables the communication of power-related parameters to facilitate dynamic power allocation decisions.

After a PD is detected and classified, the PSE would allocate power to the port. Conventionally, when a PD is powered by a PSE, recovery from a PD system crash typically involves the removal of the PoE signature or the physical recycling of the PD. In most cases, a system crash will not remove the PoE signature, thereby necessitating that the PD be physically disconnected from and reconnected to the wire. One possibility is to have a physical reset button on the device that would accomplish the removal of the signature. This manual recycling process would also need to be coordinated with an identification of the particular PSE port that it is on. This process is non-trivial for large switches. In general, the manual recycling process is time consuming and costly as it would typically involve the deployment of IT personnel.

Figure 3:
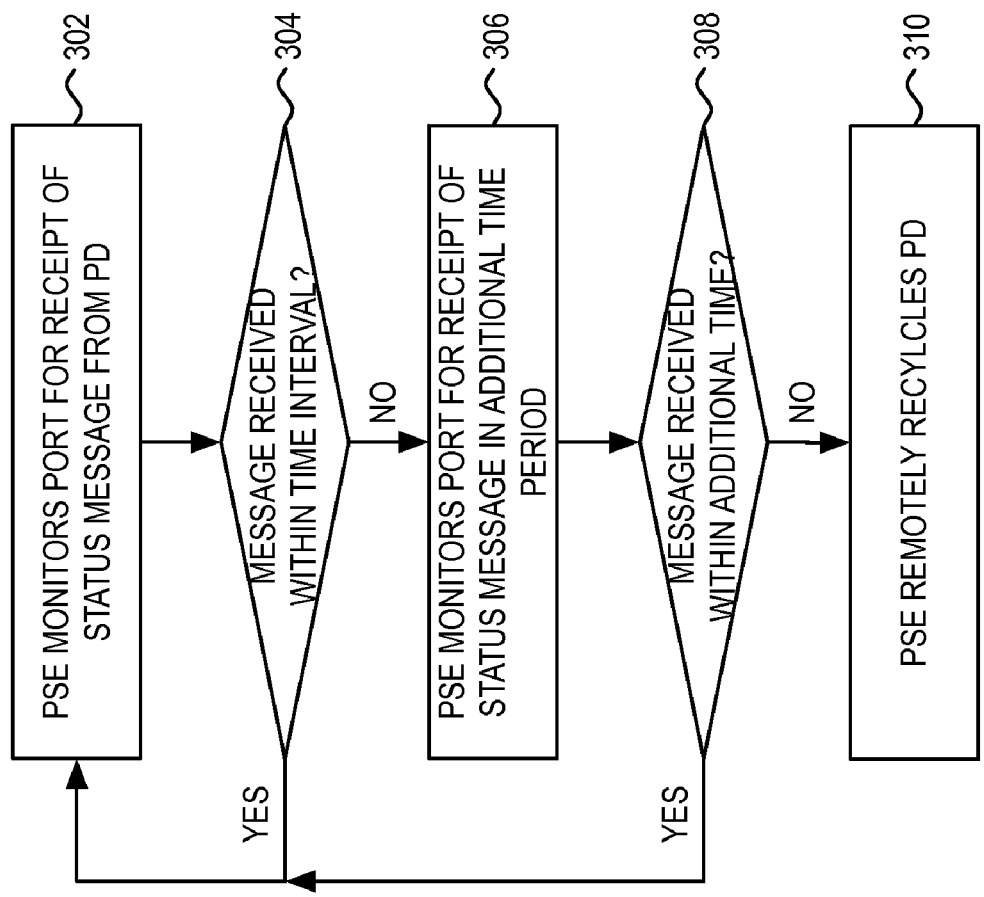
FIG. 3 illustrates a flowchart of a process of monitoring status messages to detect a failure of a PD.

In the present invention, a Layer 2 protocol is used to manage the remote recycling of the PD, thereby obviating the need to deploy IT personnel to the PD location. This remote recycling process begins upon a detection of a failure at the PD. FIG. 3 illustrates an embodiment of such a detection process. As illustrated, the process begins at step 302 where the PSE monitors the port for receipt of a status message from the PD. In one embodiment, the PD is configured to transmit a Layer 2 status message (e.g., LLDP message) periodically to alert the PSE that the PD is still active and operational.

At step 304, the PSE would then determine whether the status message was received within the expected time interval. For example, where the PD is configured to transmit a status message every one second, the time interval at step 304 would therefore be a one second time interval. If it is determined at step 304 that the status message was received within the expected time interval, then the PD is active and operational and the process would loop back to step 302 where the PSE would continue to monitor the port. If, on the other hand, it is determined at step 304 that the status message was not received within the expected time interval, then the process would continue to step 306.

At step 306, the PSE would monitor the port for an additional time period to determine if any status messages are subsequently received. In one example, this additional time period can represent a length of time that is equivalent to multiple time intervals. Thus, if a status message is not received in a time interval, the PSE could then monitor the port for an additional X time intervals to determine if a status message is received. In one embodiment, the additional time period is facilitate by a countdown timer that is started upon the failure to receive a status message.

If it is determined at step 308 that the status message was received within the additional time period, then the PD is active and operational and the process would loop back to step 302 where the PSE would continue to monitor the port. If, on the other hand, it is determined at step 308 that the status message was not received within the additional time period, then the PSE would conclude that the PD has failed. Specifically, if the PD were to crash, then the Layer 2 agent on the PD would also crash. This would therefore preclude the PD from sending a status message to the PSE.

Rather than keeping the PD powered on or retaining the last hardware or software negotiated power state, the PSE can remotely recycle the PD at step 310. It is a feature of the present invention that this remote recycling would enable the Layer 2 agent in the PD to restart and resume communication with the PSE.

Figure 4:
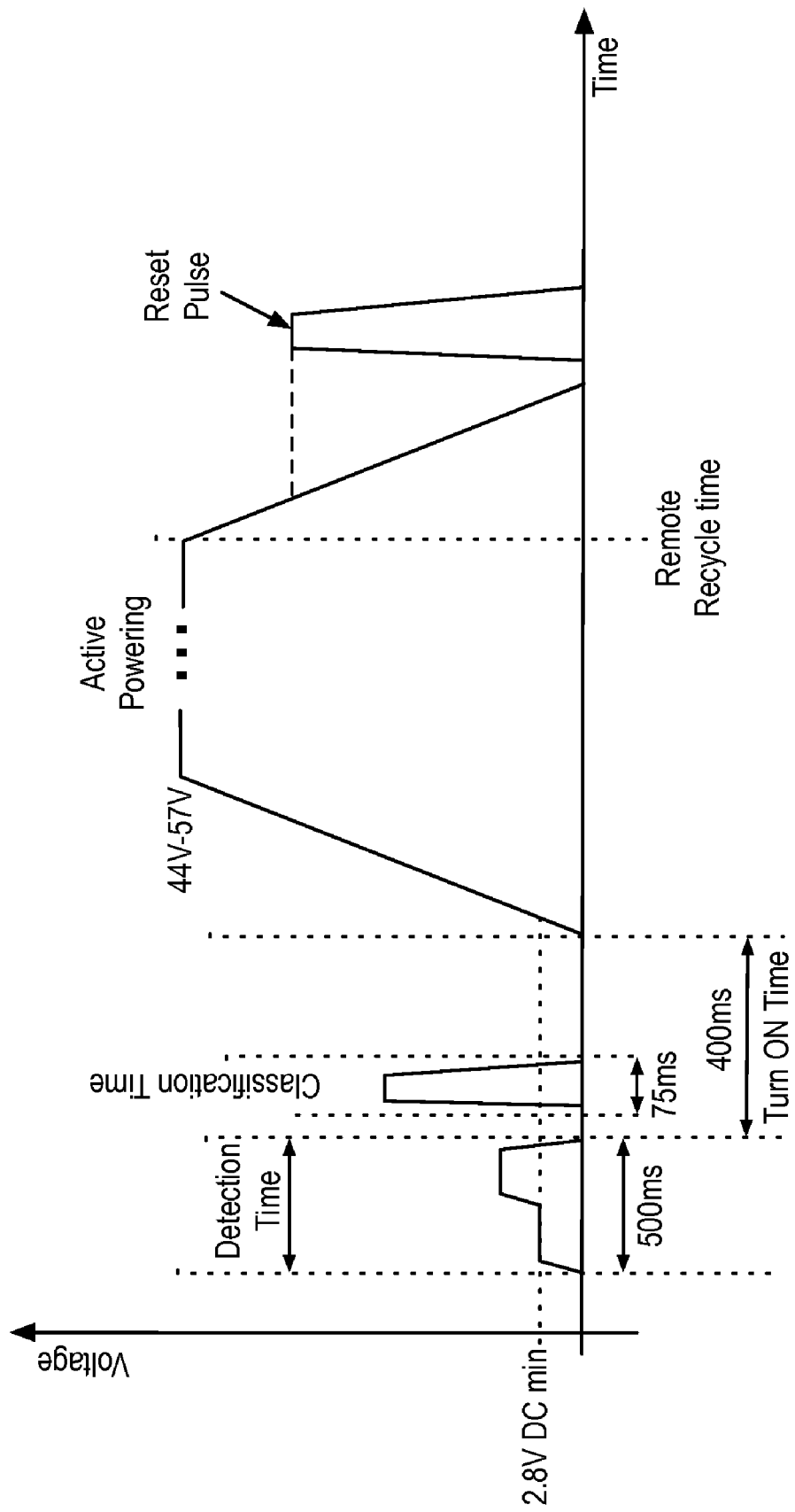
FIG. 4 illustrates an embodiment of a PD reset mechanism in a PoE process.

FIG. 4 illustrates an embodiment of a PD reset mechanism in a PoE process. In the illustration of FIG. 4, a two-point detection occurs during the 500 ms Detection time. This 500 ms Detection time is followed by a 400 ms Turn On time, during which a 75 ms Classification time would occur. The expiration of the 400 ms Turn On time would commence powering of the PD.

Upon Turn On, the PSE output voltage would continue to ramp until a desired output voltage level is reached. In an 802.3af implementation, this PSE output voltage can range from 44V-57V during active powering of the PD. In a 802.3at implementation, the PSE output voltage can range from 51V-57V during active powering of the PD. While the PD is actively powered, the Layer 2 agent can be configured to transmit periodic status messages to alert the PSE that it remains operational. Upon a detection by the PSE that a status message has not been received for a configured period of time, the PSE would then proceed to remotely recycle the PD.

In the example illustration of FIG. 4, this remote recycle time would mark the end of the active powering state. In one embodiment, the remote recycle time would include a power disconnection or other current/voltage throttling of that port by the PSE. A reset pulse would then be produced by the PSE on that port. As illustrated, this reset pulse can be designed to have a voltage level (e.g., 40V) that is distinct from the voltage level during the active powering state as well as the voltage levels of the pulses during the detection time and classification time. As would be appreciated, the particular voltage level chosen for the reset pulse would be implementation dependent. Of significance is that the voltage level of the reset pulse during that particular operating state would be detectable by the PD during that operating state in initiating a quick restart.

In one embodiment, the reset pulse need not be distinct from the voltage ramp down during disconnection. For example, the ramp down of the voltage could end at the reset voltage level that is needed to trigger the quick restart in the PD. Once that reset voltage level is reached, it would then be maintained by the PSE for a configurable amount of time to allow the PD to recognize its receipt. In yet another embodiment, the remote recycling need not be dependent on a distinct voltage level. Rather, the PSE can be configured to output a change in voltage that is detectable by the PD as a quick restart trigger.

In general, the remote restart trigger is valuable because it obviates the need for the PD to go through a complete power-up and re-boot cycle when the PSE removes the power completely from the port. This from of power recycling would force a hard reset and would not require anything special at the PD. With the principles of the present invention, the data link layer trigger is used to generate a known power signature that is recognized by the PD in initiating a quick restart. This quick restart can be designed to restart the Layer 2 engine, for example, where power is still present on the port. Moreover, this is advantageous as compared to a PSE that arbitrarily maintains or changes the power level without any assurance that the functionality of the PD would be predictable and/or guaranteed.

Figure 5:
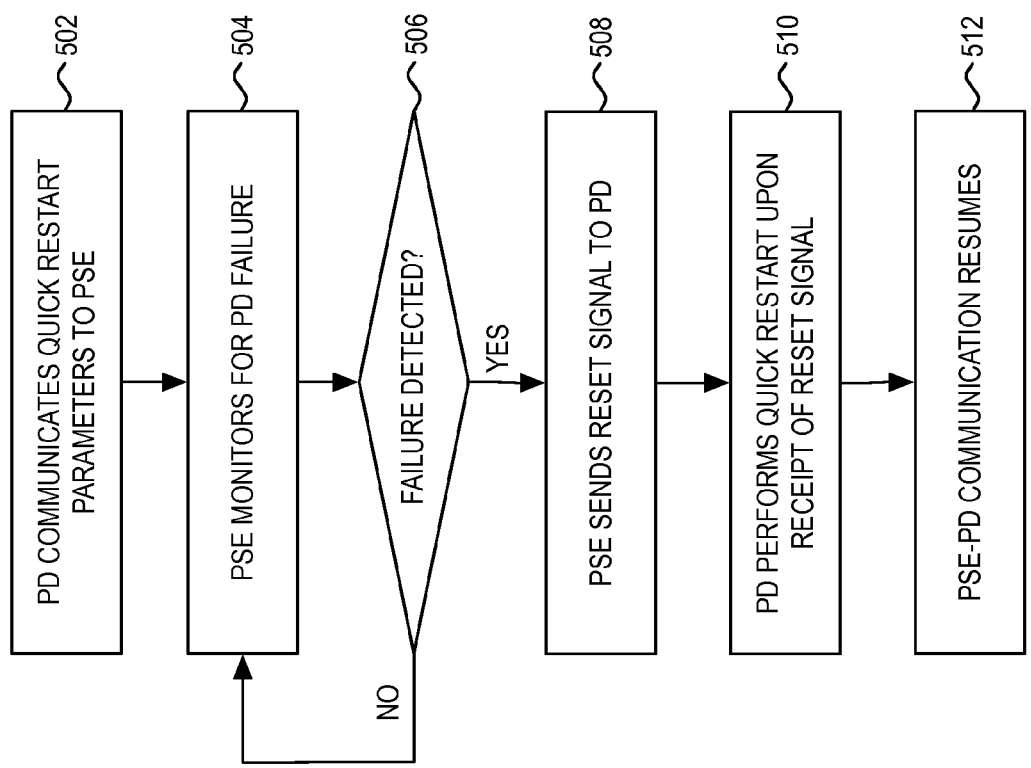
FIG. 5 illustrates a flowchart of a process of remotely recycling a PD.

To further illustrate the principles of the present invention, reference is made to the flowchart of FIG. 5, which illustrates a process of enabling such a remote recycling. As illustrated, the process begins at step 502 where the PD communicates quick restart parameters to the PSE. In the absence of a standardized industry feature set, these quick restart parameters would provide the PSE with the knowledge of the particular reset signal that would cause that PD to reset. As noted, this reset signal can be defined in various ways, including one or more parameters such as voltage level(s) for one or more reset signals (including removal and reassertion of power), pulse duration(s), dV/dt values, etc.

After the quick restart parameters have been established for the port, the PSE would then monitor for a failure of the PD at step 504. In one embodiment, this monitoring process is based on the continual receipt of periodic status messages (e.g., LLDP, LLDP-MED, OAM or any other Layer 2 protocol). As would be appreciated, the frequency of the receipt of the status messages can also be configured through a previous communication by the PD or could be dynamically changed, or could be part of the communication protocol itself or could be statically configured/changed through a higher layer management protocol such as SNMP.

If a failure is not detected at step 506, the monitoring would continue at step 504. If a failure is detected at step 506, then the PSE would send a reset signal to the PD at step 508. In one embodiment, the reset signal would conform to the restart parameters that were previously provided to the PSE by the PD. Upon receipt of the restart signal, the PD would then perform a quick restart at step 510. As noted, this quick restart need not represent a full power-up and re-boot process. For example, the quick restart can simply restart the Layer 2 agent. After a quick restart is performed, PSE-PD communication can then resume at step 512. In one example, the PSE-PD communication can enable the communication of debug information if needed. Where the PD performs a full power-up and re-boot process, this debug information may be lost. IT management can leverage this mechanism by automating the PD recovery and logging failure events for future analysis.

As has been described, a reset signal can be sent to the PD upon the initiative of the PSE. For example, the PSE can send a reset signal if it detects a failure in the PD. In one embodiment, the PD can sense that it has lost reception of frames and/or detect that it has some catastrophic failure. The PD can then request a power cycle and/or report the failure and leave it up to the PSE to decide whether to do nothing, send a reset signal or power cycle.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method in a power sourcing equipment for restarting a powered device, comprising:
    determining whether a status message has been received from the powered device on a port during a first defined interval;
    if a status message has not been received during said first defined interval, determining whether a status message has been received from said powered device on said port during an additional time period that spans beyond said first defined interval; and
    if a status message has not been received during said additional time period, then removing power from said port and transmitting a reset signal onto said port, wherein said reset signal has a voltage that is less than a minimum output voltage for said port during active powering of said powered device.

2. The method of claim 1, wherein said voltage is less than 44V.

3. The method of claim 1, wherein said voltage is less than 51V.

4. The method of claim 1, wherein said voltage is 0V.

5. The method of claim 1, wherein said voltage is determined based on a prior message from the powered device.

6. The method of claim 1, wherein said status message is a Layer 2 message.

7. The method of claim 6, wherein said status message is an LLDP message.

8. A method in a power sourcing equipment for restarting a powered device, comprising:
    powering the powered device coupled to a port of the power sourcing equipment;
    starting a timer upon a failure to receive a periodic status message from said powered device; and
    upon a failure to receive one of said periodic status messages before expiration of said timer, sending a reset pulse to the powered device, wherein said reset signal has a voltage that is less than a turn on voltage output by the power sourcing equipment during active powering.

9. The method of claim 8, wherein said voltage is less than 44V.

10. The method of claim 8, wherein said voltage is less than 51V.

11. The method of claim 8, wherein said voltage is 0V.

12. The method of claim 8, wherein said voltage is determined based on a prior message from the powered device.

13. The method of claim 8, wherein said status message is a Layer 2 message.

14. The method of claim 13, wherein said status message is an LLDP message.

15. A method in a powered device that enables the powered device to be restarted from a remote location, comprising:
    receiving an input voltage level from a power sourcing equipment, said input voltage level being sufficient to fully power the powered device;
    after failure of a power over Ethernet Layer 2 agent in the powered device to transmit a periodic status message during a first defined interval and during an additional time period that spans beyond said first timed interval, detecting a receipt of a reset voltage from said power sourcing equipment; and
    restarting said power over Ethernet Layer 2 agent in the powered device upon said detection.

16. The method of claim 15, wherein said detecting comprises detecting a reset voltage level.

17. The method of claim 15, wherein said detecting comprises detecting a reset voltage pulse.

18. The method of claim 15, wherein said detecting comprises detecting a voltage transition.

19. The method of claim 15, further comprising transmitting debug information to said power sourcing equipment after said restarting.

20. The method of claim 15, wherein said detecting comprises detecting a receipt of a reset voltage that is lower than said input voltage level.

* * * * *